(12) United States Patent
Lim (10) Patent No.: US 7,745,359 B2
(45) Date of Patent: Jun. 29, 2010

(54) COMPOSITION FOR DIELECTRIC LAYER OF PLASMA DISPLAY PANEL AND PLASMA DISPLAY PANEL INCLUDING THE SAME

(75) Inventor: Munhyuk Lim, Cheongju-si (KR)

(73) Assignee: LG Electronics Inc., Seoul (KR)

( * ) Notice: Subject to any disclaimer, the term of this patent is extended or adjusted under 35 U.S.C. 154(b) by 6 days.

(21) Appl. No.: 12/323,839

(22) Filed: Nov. 26, 2008

(65) Prior Publication Data

US 2009/0136763 A1 May 28, 2009

(30) Foreign Application Priority Data

Nov. 28, 2007 (KR) .................... 10-2007-0122165

(51) Int. Cl.
*C03C 8/14* (2006.01)
(52) U.S. Cl. ............... 501/17; 501/11; 501/20; 501/21; 501/206
(58) Field of Classification Search .......... 501/11, 501/17, 20, 21, 26
See application file for complete search history.

(56) References Cited

U.S. PATENT DOCUMENTS 4,547,467 A * 10/1985 Barth et al. ................. 501/20

2005/0062421 A1 * 3/2005 Oshio et al. ................. 313/587
2006/0181208 A1 * 8/2006 Jeon ............................ 313/582

FOREIGN PATENT DOCUMENTS

| JP | 2000-067750 A | 3/2000 |
| KR | 10-2006-0080404 A | 7/2006 |
| KR | 10-2007-0059381 A | 6/2007 |
| WO | WO 2008/150065 | * 12/2008 |

OTHER PUBLICATIONS

Korean Office Action dated Dec. 24, 2008.

* cited by examiner

*Primary Examiner*—Gwendolyn Blackwell
(74) *Attorney, Agent, or Firm*—Ked & Associates, LLP

(57) ABSTRACT

A composition for a dielectric layer of a plasma display panel and a plasma display panel including the same are disclosed. The composition includes a glass frit, a binder, a dispersant, a plasticizer, and a solvent. The binder includes about 50 to 85 parts by weight of a first monomer, about 10 to 30 parts by weight of a second monomer, and about 1 to 20 parts by weight of a third monomer based on 100 parts by weight of the binder.

16 Claims, 4 Drawing Sheets

COMPOSITION FOR DIELECTRIC LAYER OF PLASMA DISPLAY PANEL AND PLASMA DISPLAY PANEL INCLUDING THE SAME

This application claims the benefit of Korean Patent Application No. 10-2007-0122165 filed on Nov. 28, 2007, the entire contents of which is hereby incorporated by reference.

BACKGROUND

1. Field

Exemplary embodiments relate to a composition for a dielectric layer of a plasma display panel and a plasma display panel including the same.

2. Description of the Related Art

A plasma display panel generally has a structure in which an upper dielectric layer and a lower dielectric layer respectively formed on a front substrate and a rear substrate and barrier ribs formed between the front substrate and the rear substrate form unit discharge cell or discharge cells. Each discharge cell is filled with an inert gas containing a main discharge gas such as neon (Ne), helium (He) or a mixture of Ne and He, and a small amount of xenon (Xe). When the plasma display panel is discharged by a high frequency voltage, the inert gas generates vacuum ultraviolet rays, which thereby cause phosphors formed between the barrier ribs to emit light, thus displaying an image. Because it is easy to manufacture the thin, large-sized plasma display panel and also the image quality is greatly improved because of recent technology development, the plasma display panel has attracted attention as a next generation display device.

The upper and lower dielectric layers limit a discharge current during a plasma discharge, allows a glow discharge to continuously occur, serve as a memory by accumulating wall charges, and reduce a voltage by accumulating the wall charges. The upper and lower dielectric layers may be manufactured as follows. A glass powder and an additive are mixed and kneaded to form a dielectric material of a paste form, and then the dielectric material is screen printed. Then, a resulting structure is fired to complete the dielectric layers.

Recently, the method of manufacturing the plasma display panel capable of simplifying a process for forming the dielectric layer has been used. More specifically, a dielectric is formed on a base film, and then a protective film for protecting the dielectric is formed to complete a green sheet for dielectric layer. Then, the dielectric green sheet is laminated on the substrate, on which the electrode is formed, to form the dielectric layer.

The method of manufacturing the plasma display panel using the dielectric green sheet includes printing, drying, exposing, and developing an electrode material, firing the printed electrode, laminating the dielectric green sheet to form the dielectric, and firing the dielectric.

However, in the process for firing the dielectric, bubbles generated in the dielectric layer were not exhausted to the outside and were trapped. The trapped bubbles caused an error of an electrical signal, and in the end, reduced the reliability of the plasma display panel.

SUMMARY

Exemplary embodiments provide a composition for a dielectric layer of a plasma display panel and a plasma display panel including the same capable of improving manufacturing yield and reliability.

In one aspect, there is a composition for a dielectric layer of a plasma display panel comprising a glass frit, a binder, a dispersant, a plasticizer, and a solvent, wherein the binder includes about 50 to 85 parts by weight of a first monomer, about 10 to 30 parts by weight of a second monomer, and about 1 to 20 parts by weight of a third monomer based on 100 parts by weight of the binder.

The first monomer may include hexaacrylate, the second monomer may include acrylate containing an alkyl group having 1 to 5 carbon atoms, and the third monomer may include a polar group.

The glass frit may include about 20 to 35 parts by weight of zinc oxide (ZnO), about 30 to 50 parts by weight of boron oxide ($B_2O_3$), about 5 to 25 parts by weight of silicon oxide ($SiO_2$), about 0.1 to 10 parts by weight of aluminum oxide ($Al_2O_3$), and about 5 to 20 parts by weight of potassium oxide ($K_2O$) based on 100 parts by weight of the glass frit.

The glass frit may further include greater than 0 and up to about 7 parts by weight of lithium oxide ($Li_2O$) based on 100 parts by weight of the glass frit.

The glass frit may be about 40 to 55 parts by weight based on total weight of the composition.

The hexaacrylate monomer may include hexamethacrylate or 2-ethyl hexamethacrylate.

The acrylate monomer may include iso-butyl methacrylate, normal-butyl methacrylate, methyl methacrylate or ethyl methacrylate.

The monomer including the polar group may include 2-hydroxyl ethyl methacrylate or methacrylic acid.

The binder may be about 30 to 50 parts by weight based on total weight of the composition.

The dispersant may include a polyamineamide-based compound.

The dispersant may be about 0.1 to 5 parts by weight based on total weight of the composition.

The plasticizer may include at least one selected from the group consisting of phthalate-based, dioctyl adipate (DOA)-based, dioctyl azelate (DOZ)-based, and ester-based plasticizers.

The plasticizer may be about 0.1 to 5 parts by weight based on total weight of the composition.

The solvent may include at least one selected from the group consisting of toluene, propylene glycol mononethyl ether (PGME), butylacetate (BA), methylethylketone (MEK), and cyclohexanone (CYC).

In another aspect, there is a composition for a dielectric layer of a plasma display panel comprising a glass frit, wherein the glass frit includes about 20 to 35 parts by weight of zinc oxide (ZnO), about 30 to 50 parts by weight of boron oxide ($B_2O_3$), about 5 to 25 parts by weight of silicon oxide ($SiO_2$), about 0.1 to 10 parts by weight of aluminum oxide ($Al_2O_3$), and about 5 to 20 parts by weight of potassium oxide ($K_2O$) based on 100 parts by weight of the glass frit.

The glass frit may further include greater than 0 and up to about 7 parts by weight of lithium oxide ($Li_2O$) based on 100 parts by weight of the glass frit.

In another aspect, there is a plasma display panel comprising a front substrate, a rear substrate positioned opposite the front substrate, and a dielectric layer on the front substrate, the dielectric layer including a glass frit, wherein the glass frit includes about 20 to 35 parts by weight of zinc oxide (ZnO), about 30 to 50 parts by weight of boron oxide ($B_2O_3$), about 5 to 25 parts by weight of silicon oxide ($SiO_2$), about 0.1 to 10 parts by weight of aluminum oxide ($Al_2O_3$), and about 5 to 20 parts by weight of potassium oxide ($K_2O$) based on 100 parts by weight of the glass frit.

The glass frit may further include greater than 0 and up to about 7 parts by weight of lithium oxide ($Li_2O$).

The dielectric layer may have a withstanding voltage of substantially 3 kv to 5 kv.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF PREFERRED EMBODIMENTS

Reference will now be made in detail embodiments of the invention examples of which are illustrated in the accompanying drawings.

Figure 1:
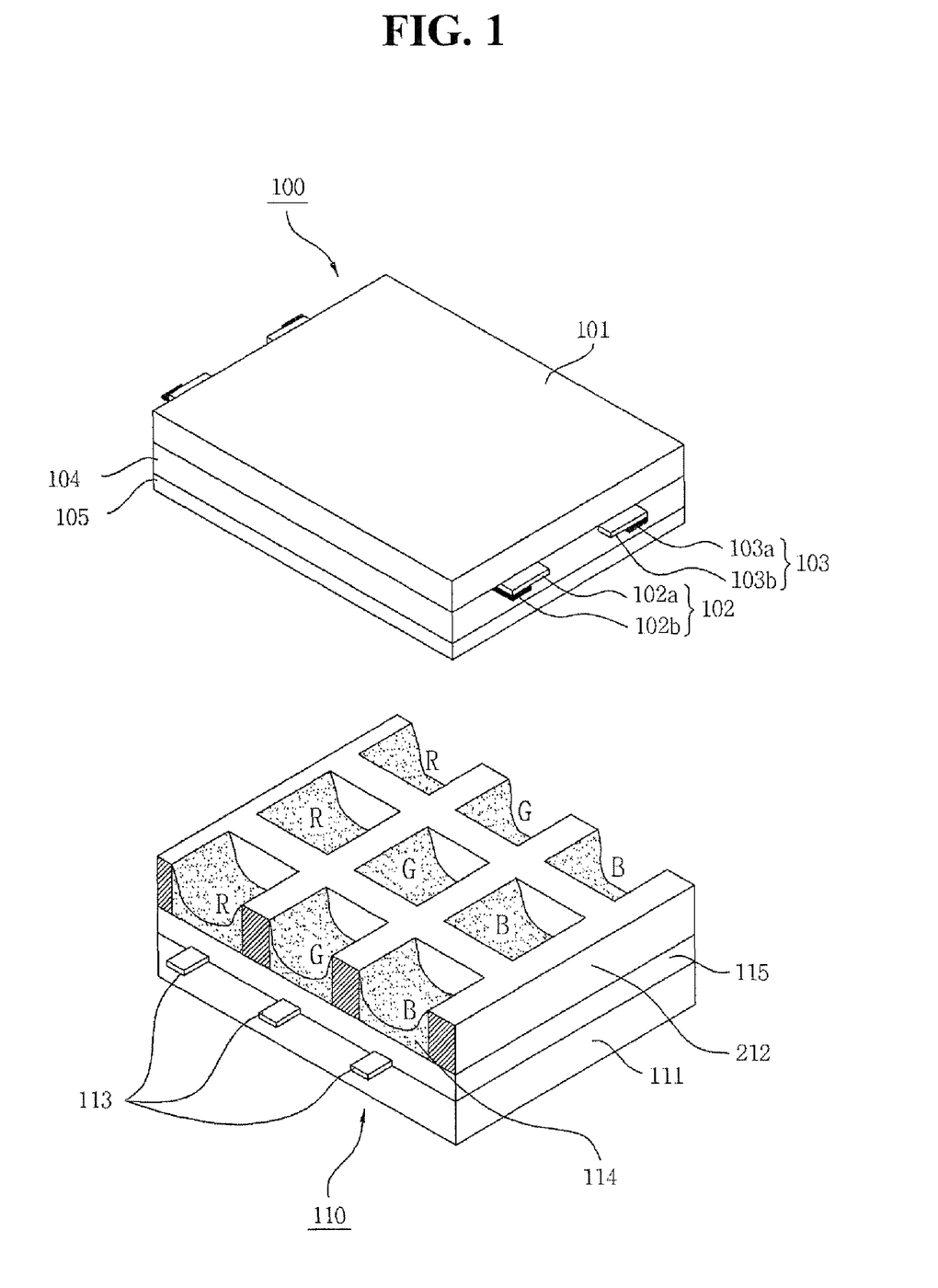
FIG. 1 shows a plasma display panel according to an exemplary embodiment.
Figure 2:
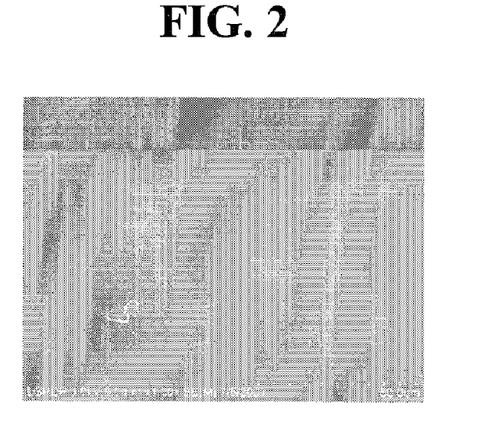
FIGS. 2 to 9 show dielectric layers manufactured in accordance with experimental examples and comparative examples.
Figure 3:
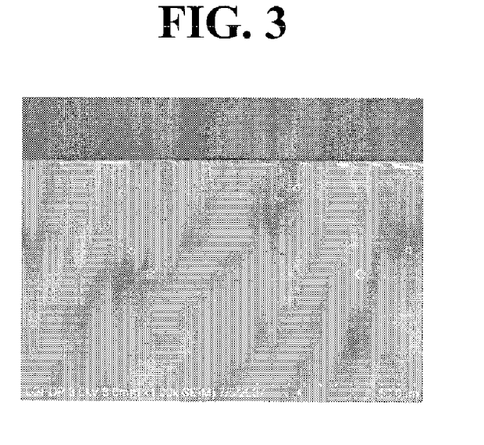
Figure 4:
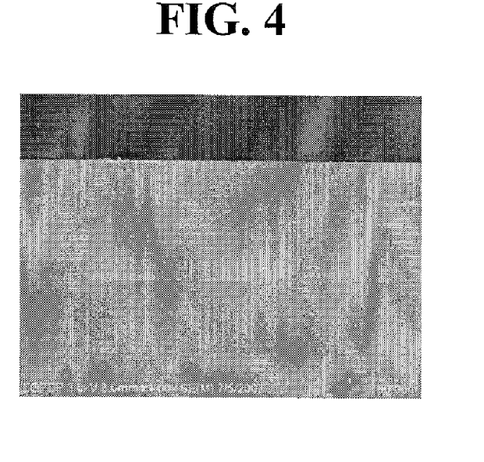
Figure 5:
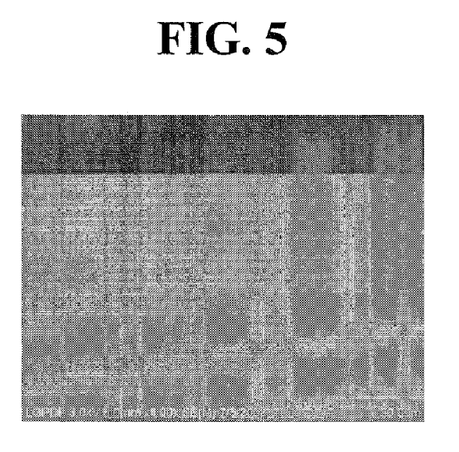
Figure 6:
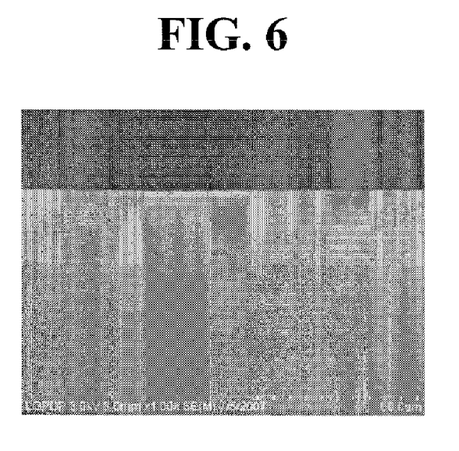
Figure 7:
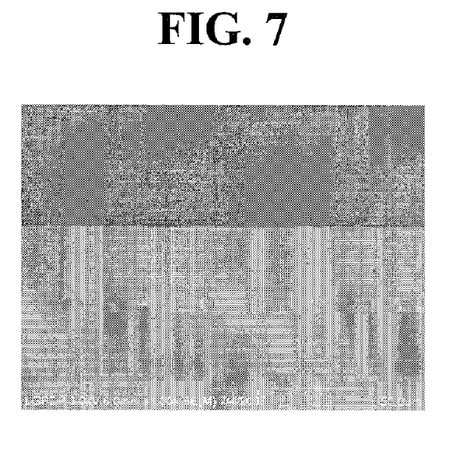
Figure 8:
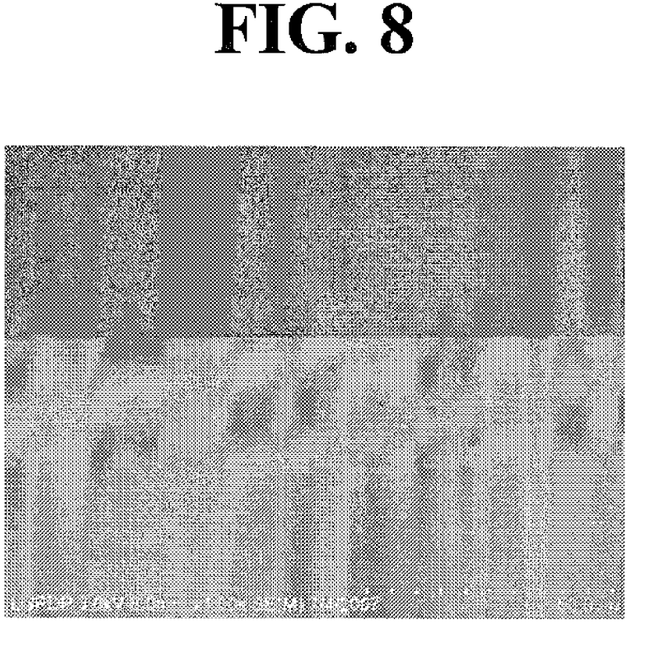
Figure 9:
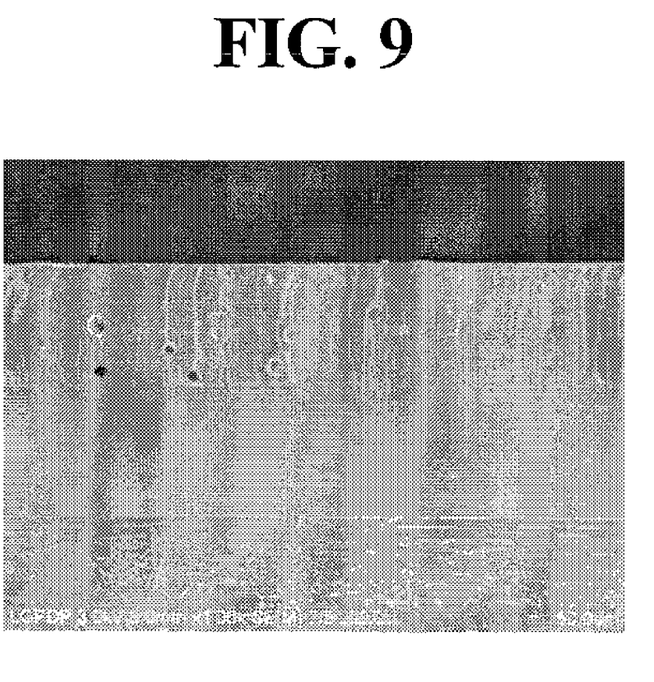

FIG. 1 shows a plasma display panel according to an exemplary embodiment.

As shown in FIG. 1, the plasma display panel according to the exemplary embodiment includes a front panel 100 and a rear panel 110 which are positioned parallel to each other at a given distance therebetween. The front panel 100 includes a front substrate 101 on which a scan electrode 102 and a sustain electrode 103 are formed. The rear panel 110 includes a rear substrate 111 on which an address electrode 113 is formed to intersect the scan electrode 102 and the sustain electrode 103.

The scan electrode 102 and the sustain electrode 103 generate a discharge in a discharge cell and allow light to be continuously emitted from the discharge cells. More specifically, the scan electrode 102 and the sustain electrode 103 each include transparent electrodes 102a and 103a made of a transparent indium-tin-oxide (ITO) material and bus electrodes 102b and 103b made of an opaque metal material. The scan electrode 102 and the sustain electrode 103 are covered with one or more upper dielectric layers 104 for limiting a discharge current and providing insulation between the scan electrode 102 and the sustain electrode 103. A protective layer 105 with a deposit of MgO is positioned on the upper dielectric layer 104 to facilitate discharge conditions.

The rear panel 110 includes a plurality of stripe-type or well-type barrier ribs 112 for partitioning a plurality of discharge spaces, i.e., the plurality of discharge cells.

A phosphor layer 114, for example, red (R), green (G), and blue (B) phosphor layers for emitting visible light for an image display during an address discharge are positioned inside the discharge cells partitioned by the barrier ribs 112.

A lower dielectric layer 115 is formed between the address electrode 113 and the phosphor layer 114.

Although the upper dielectric layer 104 and the lower dielectric layer 115 are respectively formed on the front substrate 101 and the rear substrate 111 in the exemplary embodiment, the exemplary embodiment is not limited thereto. On the contrary, the upper dielectric layer 104 and the lower dielectric layer 115 may be respectively formed on the rear substrate 111 and the front substrate 101.

FIG. 1 has shown and described only an example of the plasma display panel, and thus the exemplary embodiment is not limited to the structure of the plasma display panel shown in FIG. 1. For example, the plasma display panel shown in FIG. 1 includes the scan electrode 102, the sustain electrode 103, and the address electrode 113, but at least one of the scan electrode 102, the sustain electrode 103, or the address electrode 113 may be omitted.

Further, FIG. 1 shows the barrier ribs 112 formed on the rear substrate 111, but the barrier ribs 112 may be formed on the front substrate 101. The barrier ribs 112 may be formed on both the front substrate 101 and the rear substrate 111.

In the plasma display panel according to the exemplary embodiment, the upper dielectric layer 104 and the lower dielectric layer 115 are respectively formed on the front substrate 101 and the rear substrate 111, the dielectric layers 104 and 115 include a glass frit, the glass frit includes about 20 to 35 parts by weight of zinc oxide (ZnO), about 30 to 50 parts by weight of boron oxide ($B_2O_3$), about 5 to 25 parts by weight of silicon oxide ($SiO_2$), about 0.1 to 10 parts by weight of aluminum oxide ($Al_2O_3$), and about 5 to 20 parts by weight of potassium oxide ($K_2O$) based on 100 parts by weight of the glass frit. The plasma display panel according to the exemplary embodiment may be variously changed except the above-described conditions.

The composition for the dielectric layer of the plasma display panel according to the exemplary embodiment will be below described in detail.

The composition for the dielectric layer (hereinafter, referred to as the dielectric composition) may include a glass frit, a binder, a dispersant, a plasticizer, and a solvent so that the dielectric layer allows a glow discharge to continuously occur and allows wall charges to be accumulated.

Glass frit content may be about 40 to 55 parts by weight based on total weight of the dielectric composition. The glass frit may include about 20 to 35 parts by weight of zinc oxide (ZnO), about 30 to 50 parts by weight of boron oxide ($B_2O_3$), about 5 to 25 parts by weight of silicon oxide ($SiO_2$), about 0.1 to 10 parts by weight of aluminum oxide ($Al_2O_3$), and about 5 to 20 parts by weight of potassium oxide ($K_2O$) based on 100 parts by weight of the glass frit. The glass frit may further include greater than 0 and up to about 7 parts by weight of lithium oxide ($Li_2O$) based on 100 parts by weight of the glass frit.

The dielectric composition may include about 20 to 35 parts by weight of ZnO based on 100 parts by weight of the glass frit. ZnO plays a part in lowering a glass transition temperature and a glass softening temperature of the dielectric layer. More specifically, when ZnO content based on 100 parts by weight of the glass frit is equal to or greater than 20 parts by weight, the glass transition temperature and the glass softening temperature can be sufficiently lowered. When ZnO content based on 100 parts by weight of the glass frit is equal to or less than 35 parts by weight, a glass crystallization can be prevented from being generated by the dielectric composition.

The dielectric composition may include about 30 to 50 parts by weight of $B_2O_3$ based on 100 parts by weight of the glass frit. $B_2O_3$ plays a part in forming a network structure of the dielectric layer. More specifically, when $B_2O_3$ content based on 100 parts by weight of the glass frit is equal to or greater than 30 parts by weight, the network structure of the dielectric layer can be fully formed. When $B_2O_3$ content based on 100 parts by weight of the glass frit is equal to or less than 50 parts by weight, a rise in the glass transition temperature of the dielectric layer can be prevented.

The dielectric composition may include about 5 to 25 parts by weight of $SiO_2$ based on 100 parts by weight of the glass frit. $SiO_2$ serving as a glass forming component plays a part in chemically and optically stabilizing a glass and in greatly raising the glass transition temperature and the glass softening temperature of the dielectric layer. More specifically, when $SiO_2$ content based on 100 parts by weight of the glass frit is equal to or greater than 5 parts by weight, the dielectric layer can be chemically and optically stabilized. When $SiO_2$ content based on 100 parts by weight of the glass frit is equal to or less than 25 parts by weight, an excessive rise in the glass transition temperature can be prevented.

The dielectric composition may include about 0.1 to 10 parts by weight of $Al_2O_3$ based on 100 parts by weight of the glass frit. $Al_2O_3$ plays a part in improving mechanical and chemical stability of the dielectric layer by reducing a thermal expansion coefficient and increasing a high temperature viscosity. More specifically, when $Al_2O_3$ content based on 100 parts by weight of the glass frit is equal to or greater than 0.1 parts by weight, the thermal expansion coefficient can be reduced and the mechanical and chemical stability of the dielectric layer can be improved. When $Al_2O_3$ content based on 100 parts by weight of the glass frit is equal to or less than 10 parts by weight, the thermal expansion coefficient and a viscosity behavior in a firing region are proper.

The dielectric composition may include about 5 to 20 parts by weight of $K_2O$ based on 100 parts by weight of the glass frit. $K_2O$ plays a part in preventing a discoloration of the dielectric layer. More specifically, when $K_2O$ content based on 100 parts by weight of the glass frit is equal to or greater than 5 parts by weight, the discoloration of the dielectric layer can be prevented. When $K_2O$ content based on 100 parts by weight of the glass frit is equal to or less than 20 parts by weight, glass can be prevented from being colored to $K_2O$.

The dielectric composition may further include greater than 0 and up to about 7 parts by weight of $Li_2O$. $Li_2O$ controls a firing temperature by lowering the glass transition temperature of the dielectric layer, increases a dielectric constant, and slightly increases a thermal expansion coefficient. More specifically, when $Li_2O$ content is greater than 0, a reduction in the dielectric constant can be prevented. When $Li_2O$ content based on 100 parts by weight of the glass frit is equal to or less than 7 parts by weight, a firing process can be easily preformed due to the appropriate glass transition temperature.

As above, the dielectric composition according to the exemplary embodiment may include the glass frit, and the glass frit may include ZnO, $B_2O_3$, $SiO_2$, $Al_2O_3$, $K_2O$, and $Li_2O$.

Further, the dielectric composition may include about 30 to 50 parts by weight of the binder based on total weight of the dielectric composition. The binder may include a first monomer, a second monomer, and a third monomer.

The first monomer may use hexacrylate monomer. For example, the hexacrylate monomer may be hexamethacrylate or 2-ethyl hexamethacrylate.

The second monomer may use acrylate monomer containing an alkyl group having 1 to 5 carbon atoms. For example, the acrylate monomer may be at least one selected from the group consisting of methacrylate, iso-butyl methacrylate, normal-butyl methacrylate, methyl methacrylate, and ethyl methacrylate.

The third monomer may use a monomer containing a polar group. For example, the polar group containing monomer may be at least one selected from the group consisting of methacrylate, acrylate, 2-hydroxy ethyl methacrylate, and methacrylic acid.

The dielectric composition may include the binder, and the binder may includes about 50 to 85 parts by weight of the first monomer, about 10 to 30 parts by weight of the second monomer, and about 1 to 20 parts by weight of the third monomer based on 100 parts by weight of the binder.

The dielectric composition may include about 0.1 to 5 parts by weight of the dispersant based on total weight of the dielectric composition. The dispersant can prevent the glass frit from being deposited on the dielectric layer by increasing a dispersion force of the glass frit. The dispersant may use a polyamineamide-based compound.

The dielectric composition may include about 0.1 to 5 parts by weight of the plasticizer based on total weight of the dielectric composition. The plasticizer can adjust a dry speed of the dielectric layer and give the flexibility to a dried layer. The plasticizer may include at least one selected from the group consisting of phthalate-based, dioctyl adipate (DOA)-based, dioctyl azelate (DOZ)-based, and ester-based plasticizers. For example, the plasticizer may use butylbenzyl phthalate, dioctyl phthalate, diisooctyl phthalate, dicapryl phthalate, dibutyl phthalate, and the like.

The dielectric composition may include about 5 to 20 parts by weight of the solvent based on total weight of the dielectric composition. The solvent may use a solvent with a boiling point equal to or higher than 150° C. capable of melting the binder and being well mixed with other additives. The solvent may include at least one selected from the group consisting of toluene, propylene glycol mononethyl ether (PGME), butylacetate (BA), methylethylketone (MEK), and cyclohexanone (CYC). For example, the solvent may use ethyl carbitol, butyl carbitol, ethyl carbitol acetate, butyl carbitol acetate, texanol, terpene oil, dipropylene glycol methyl ether, dipropylene glycol ethyl ether, dipropylene glycol monomethyl ether acetate, cellosolve acetate, butyl cellosolve acetate, tripropylene glycol, and the like.

The dielectric composition may further include an additive. The additive may include an antioxidant, an ultraviolet ray absorbent for improving a resolution, a sensitizer for improving sensitivity, and the like. The additive may further include a labeling agent for improving the planarization of a layer during a printing process such as polyester degeneration dimethyl polysiloxane, polyhydroxy carboxylic acid amide, silicone-based polyacrylate copolymer, or fluorine-based paraffin compound. The labeling agent may include a polymerization prohibiting agent for improving the conservation of a coating composition such as phosphate, ester phosphate, and carboxylic acid containing compound.

The above-described dielectric composition for the plasma display panel according to the exemplary embodiment and a method of manufacturing the dielectric composition will be described below.

The dielectric composition for the plasma display panel according to the exemplary embodiment can be manufactured through the following manufacturing method. More specifically, a predetermined amount of glass frit powder is uniformly mixed. Then, the glass frit powder is melted in a platinum crucible at a temperature of 1,000 to 1,500 for 10 to 60 minutes, and thus may be uniformly mixed in a melting state.

The melted mixture is rapidly cooled and then ground. The rapid cooling process may be performed in a dry or wet manner, and water may be used in the wet cooling process. After the rapid cooling process, the grinding process may be performed in a dry or wet manner, and water or an organic solvent may be used in the wet grinding process.

The ground glass frit powder is filtered, dried, and disintegrated to manufacture a dielectric powder having a small particle diameter, for example, a particle diameter of 0.1 μm to 10 μm. Subsequently, the dielectric powder, the binder, the dispersant, the plasticizer, and the solvent are mixed in a predetermined ratio and knead to form a dielectric paste.

The dielectric composition according to the exemplary embodiment is manufactured by forming the manufactured dielectric paste in the form of a green sheet. More specifically, the dielectric paste is coated on a base film formed of polyester, and the like, and then a protective film is formed on the coated dielectric paste to form a green sheet for dielectric layer.

Various experimental examples of a method of manufacturing the dielectric composition according to the exemplary embodiment will be described below. The following experimental examples are only one example of the exemplary embodiment, and thus the exemplary embodiment is not limited thereto.

Experimental Example 1

8 g of ZnO, 20 g of $B_2O_3$, 8 g of $SiO_2$, 2 g of $Al_2O_3$, 1 g of $K_2O$, and 1 g of $Li_2O$ were mixed, and the mixture was melted in a furnace at a temperature of 1,200□. The melted mixture was dried, rapidly cooled, and then ground to manufacture 40 g of a glass frit powder.

25 g of 2-ethyl hexamethacrylate, 15 g of iso-butyl methacrylate, and 10 g of 2-hydroxy ethyl methacrylate were mixed to form 50 g of a binder.

0.1 g of polyamineamide as a dispersant, 0.1 g of dioctyl phthalate as a plasticizer, and 9.8 g of toluene as a solvent were prepared and then were mixed with 40 g of the glass frit powder and 50 g of the binder to manufacture a dielectric paste.

The manufactured dielectric paste was coated on a polyester base film, and then a protective film was formed on the dielectric paste to manufacture a green sheet for dielectric layer. Next, the dielectric green sheet was laminated on a rear substrate on which an address electrode was formed and then fired to manufacture a dielectric layer.

Experimental Example 2

A dielectric layer of an experimental example 2 was manufactured under the same conditions as the above experimental example 1, except a dielectric composition. More specifically, 10 g of ZnO, 20 g of $B_2O_3$, 8 g of $SiO_2$, 4 g of $Al_2O_3$, 1 g of $K_2O$, and 1 g of $Li_2O$ were used to form 44 g of a glass frit powder.

28 g of 2-ethyl hexamethacrylate, 10 g of iso-butyl methacrylate, and 2 g of 2-hydroxy ethyl methacrylate were used to form a binder. 0.5 g of polyamineamide as a dispersant, 2 g of dioctyl phthalate as a plasticizer, and 13.5 g of toluene as a solvent were used.

Experimental Example 3

A dielectric layer of an experimental example 3 was manufactured under the same conditions as the above experimental example 1, except a dielectric composition. More specifically, 12 g of ZnO, 19 g of $B_2O_3$, 8 g of $SiO_2$, 4 g of $Al_2O_3$, 3 g of $K_2O$, and 1 g of $Li_2O$ were used to form 47 g of a glass frit powder.

20 g of 2-ethyl hexamethacrylate, 10 g of iso-butyl methacrylate, and 7 g of 2-hydroxy ethyl methacrylate were used to form a binder. 1 g of polyamineamide as a dispersant, 1 g of dioctyl phthalate as a plasticizer, and 14 g of toluene as a solvent were used.

Experimental Example 4

A dielectric layer of an experimental example 4 was manufactured under the same conditions as the above experimental example 1, except a dielectric composition. More specifically, 14 g of ZnO, 20 g of $B_2O_3$, 10 g of $SiO_2$, 4 g of $Al_2O_3$, 4.5 g of $K_2O$, and 2.5 g of $Li_2O$ were used to form 55 g of a glass frit powder.

23 g of 2-ethyl hexamethacrylate, 4.5 g of iso-butyl methacrylate, and 2.5 g of 2-hydroxy ethyl methacrylate were used to form a binder. 5 g of polyamineamide as a dispersant, 5 g of dioctyl phthalate as a plasticizer, and 5 g of toluene as a solvent were used.

Comparative Example 1

A dielectric layer of a comparative example 1 was manufactured under the same conditions as the above experimental example 1, except a dielectric composition. More specifically, 5 g of ZnO, 25 g of $B_2O_3$, 2 g of $SiO_2$, 1 g of $Al_2O_3$, 1 g of $K_2O$, and 1 g of $Li_2O$ were used to form 35 g of a glass frit powder.

30 g of 2-ethyl hexamethacrylate, 15 g of iso-butyl methacrylate, and 10 g of 2-hydroxy ethyl methacrylate were used to form a binder. 1 g of dioctyl phthalate as a plasticizer and 9 g of toluene as a solvent were used, and a dispersant is not used.

Comparative Example 2

A dielectric layer of a comparative example 2 was manufactured under the same conditions as the above experimental example 1, except a dielectric composition. More specifically, 7 g of ZnO, 26 g of $B_2O_3$, 2 g of $SiO_2$, 1 g of $Al_2O_3$, 1 g of $K_2O$, and 1 g of $Li_2O$ were used to form 38 g of a glass frit powder.

28 g of 2-ethyl hexamethacrylate, 14 g of iso-butyl methacrylate, and 10 g of 2-hydroxy ethyl methacrylate were used to form a binder. 2 g of dioctyl phthalate as a plasticizer and 8 g of toluene as a solvent were used, and a dispersant is not used.

Comparative Example 3

A dielectric layer of a comparative example 3 was manufactured under the same conditions as the above experimental example 1, except a dielectric composition. More specifically, 18 g of ZnO, 20 g of $B_2O_3$, 9 g of $SiO_2$, 4 g of $Al_2O_3$, 4.5 g of $K_2O$, and 2.5 g of $Li_2O$ were used to form 58 g of a glass frit powder.

20 g of 2-ethyl hexamethacrylate, 4 g of iso-butyl methacrylate, and 4 g of 2-hydroxy ethyl methacrylate were used to form a binder. 6 g of polyamineamide as a dispersant, 2 g of dioctyl phthalate as a plasticizer, and 6 g of toluene as a solvent were used.

Comparative Example 4

A dielectric layer of a comparative example 4 was manufactured under the same conditions as the above experimental example 1, except a dielectric composition. More specifically, 16 g of ZnO, 26 g of $B_2O_3$, 12 g of $SiO_2$, 2 g of $Al_2O_3$, 2 g of $K_2O$, and 2 g of $Li_2O$ were used to form 60 g of a glass frit powder.

18 g of 2-ethyl hexamethacrylate, 5 g of iso-butyl methacrylate, and 1 g of 2-hydroxy ethyl methacrylate were used to form a binder. 6 g of polyamineamide as a dispersant, 2 g of dioctyl phthalate as a plasticizer, and 6 g of toluene as a solvent were used.

In each of plasma display panels manufactured in accordance with the experimental examples 1 to 4 and the comparative examples 1 to 4, a transmittance and a withstanding voltage of the dielectric layer were measured, and a measure of whether or not bubbles were trapped and a measure of whether or not discoloration of the dielectric layer was caused were performed. The measuring result was indicated in the following Table 1 and FIGS. 2 to 9. In Table 1, in the bubble measure, ○ represents that the bubbles are trapped, and × represents that the bubbles are not trapped. Further, in the discoloration measure, ○ represents that the dielectric layer are discolored, and × represents that the dielectric layer are not discolored.

TABLE 1

| | Dielectric composition | | | | | Characteristics after firing dielectric composition | | | |
|---|---|---|---|---|---|---|---|---|---|
| | Glass frit (g) | Binder (g) | Dispersant (g) | Plasticizer (g) | Solvent (g) | Transmittance (%, 550 nm) | Withstanding voltage (Kv) | Measure of whether or not bubbles are trapped | Measure of whether or not discoloration is caused |
| Experimental example 1 | 40 | 50 | 0.1 | 0.1 | 9.8 | 53 | 4.2 | X | X |
| Experimental example 2 | 44 | 40 | 0.5 | 2 | 13.5 | 62 | 3.8 | X | X |
| Experimental example 3 | 47 | 37 | 1 | 1 | 14 | 68 | 4.0 | X | X |
| Experimental example 4 | 55 | 30 | 5 | 5 | 5 | 55 | 3.7 | X | X |
| Comparative example 1 | 35 | 55 | 0 | 1 | 9 | 28 | 2.5 | ○ | ○ |
| Comparative example 2 | 38 | 52 | 0 | 2 | 8 | 35 | 1.78 | ○ | ○ |
| Comparative example 3 | 58 | 28 | 6 | 2 | 6 | 32 | 2.7 | ○ | ○ |
| Comparative example 4 | 60 | 24 | 7 | 1 | 8 | 27 | 2.5 | ○ | ○ |

Table 1 and FIGS. 2 to 9 show characteristics of the dielectric layers manufactured in accordance with the experimental examples 1 to 4 and the comparative examples 1 to 4 after the firing process is performed.

More specifically, in the experimental examples 1 to 4 shown in FIGS. 2 to 5, the dielectric composition included about 40 to 55 parts by weight of the glass frit based on total weight of the dielectric composition, the glass frit included about 20 to 35 parts by weight of ZnO, about 30 to 50 parts by weight of $B_2O_3$, about 5 to 25 parts by weight of $SiO_2$, about 0.1 to 10 parts by weight of $Al_2O_3$, about 5 to 20 parts by weight of $K_2O$, and greater than 0 and up to about 7 parts by weight of $Li_2O$ based on 100 parts by weight of the glass frit, and the binder included about 50 to 85 parts by weight of a first monomer, about 10 to 30 parts by weight of a second monomer, and about 1 to 20 parts by weight of a third monomer based on 100 parts by weight of the binder. Hence, the bubbles were not trapped in the dielectric layer of the experimental examples 1 to 4. However, in the comparative examples 1 to 4 shown in FIGS. 6 to 9, the bubbles were trapped in the dielectric layer.

Because a dielectric constant of the dielectric layer formed of the dielectric composition of the experimental examples 1 to 4 may be reduced, the withstanding voltages in the experimental examples 1 to 4 were higher than the withstanding voltages in the comparative examples 1 to 4 and lay substantially between 3 kv and 5 kv.

The transmittances of the dielectric layer formed of the dielectric composition of the experimental examples 1 to 4 were higher than the transmittance in the comparative examples 1 to 4 and lay substantially between 50% and 70%.

After the firing process was performed on the dielectric composition, the dielectric layer formed of the dielectric composition of the experimental examples 1 to 4 was not discolored. However, the dielectric layer was discolored in the comparative examples 1 to 4.

As described above, in the dielectric composition according to the exemplary embodiment, after the firing process is performed on the dielectric composition, the bubbles are not trapped. Hence, the plasma display panel with excellent reliability may be provided without a failure of electrical signals.

The foregoing embodiments and advantages are merely exemplary and are not to be construed as limiting the present invention. The present teaching can be readily applied to other types of apparatuses. The description of the foregoing embodiments is intended to be illustrative, and not to limit the scope of the claims. Many alternatives, modifications, and variations will be apparent to those skilled in the art.

What is claimed is:

1. A composition for a dielectric layer of a plasma display panel, the composition comprising a glass frit, a binder, a dispersant, a plasticizer, and a solvent,
   wherein the binder includes about 50 to 85 parts by weight of a first monomer, about 10 to 30 parts by weight of a second monomer, and about 1 to 20 parts by weight of a third monomer based on 100 parts by weight of the binder,
   wherein the dispersant includes a polyamineamide-based compound.

2. The composition of claim 1, wherein an amount of the binder is about 30 to 50 parts by weight based on total weight of the composition.

3. The composition of claim 1, wherein an amount of the dispersant is about 0.1 to 5 parts by weight based on total weight of the composition.

4. The composition of claim 1, wherein the plasticizer includes at least one selected from the group consisting of phthalate-based, dioctyl adipate (DOA)-based, dioctyl azelate (DOZ)-based, and ester-based plasticizers.

5. The composition of claim 1, wherein an amount of the plasticizer is about 0.1 to 5 parts by weight based on total weight of the composition.

6. The composition of claim 1, wherein the solvent includes at least one selected from the group consisting of toluene, propylene glycol mononethyl ether (PGME), butylacetate (BA), methylethylketone (MEK), and cyclohexanone (CYC).

7. The composition of claim 1, wherein the first monomer includes hexaacrylate, the second monomer includes acrylate containing an alkyl group having 1 to 5 carbon atoms, and the third monomer includes a polar group.

8. The composition of claim 7, wherein the hexaacrylate monomer includes hexamethacrylate or 2-ethyl hexamethacrylate.

9. The composition of claim 7, wherein the acrylate monomer includes iso-butyl methacrylate, normal-butyl methacrylate, methyl methacrylate or ethyl methacrylate.

10. The composition of claim 7, wherein the monomer including the polar group includes 2-hydroxylethyl methacrylate or methacrylic acid.

11. The composition of claim 1, wherein the glass frit includes about 20 to 35 parts by weight of zinc oxide (ZnO), about 30 to 50 parts by weight of boron oxide ($B_2O_3$), about 5 to 25 parts by weight of silicon oxide ($SiO_2$), about 0.1 to 10 parts by weight of aluminum oxide ($Al_2O_3$), and about 5 to 20 parts by weight of potassium oxide ($K_2O$) based on 100 parts by weight of the glass frit.

12. The composition of claim 11, wherein the glass frit further includes greater than 0 and up to about 7 parts by weight of lithium oxide ($Li_2O$) based on 100 parts by weight of the glass frit.

13. The composite of claim 11, wherein an amount of the glass frit is about 40 to 55 parts by weight based on total weight of the composition.

14. A plasma display panel comprising:

a front substrate;

a rear substrate positioned opposite the front substrate; and a dielectric layer on the front substrate, the dielectric layer including a glass frit a binder, a dispersant, a plasticizer, and a solvent, wherein the glass frit includes about 20 to 35 parts by weight of zinc oxide (ZnO), about 30 to 50 parts by weight of boron oxide (13203), about 5 to 25 parts by weight of silicon oxide ($SiO_2$), about 0.1 to 10 parts by weight of aluminum oxide ($Al_2O_3$), and about 5 to 20 parts by weight of potassium oxide (1(20) based on 100 parts by weight of the glass frit, wherein the binder includes about 50 to 85 parts by weight of a first monomer, about 10 to 30 parts by weight of a second monomer, and about 1 to 20 parts by weight of a third monomer based on 100 parts by weight of the binder, wherein the dispersant includes a polyamineamide-based compound.

15. The plasma display panel of claim 14, wherein the glass frit further includes greater than 0 and up to about 7 parts by weight of lithium oxide ($Li_2O$).

16. The plasma display panel of claim 14, wherein the dielectric layer has a withstanding voltage of substantially 3 kv to 5 kv.

* * * * *